United States Patent
Hirose et al.

(10) Patent No.: US 8,059,130 B2
(45) Date of Patent: Nov. 15, 2011

(54) DOCUMENT RESERVATION PROCESSING OPERATION SYSTEM

(75) Inventors: Yoshitsugu Hirose, Kanagawa (JP);
   Hiroyuki Hotta, Kanagawa (JP);
   Minoru Koshimizu, Kanagawa (JP);
   Naoki Hayashi, Kanagawa (JP); Masao Watanabe, Kanagawa (JP); Hiroyuki Funo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1342 days.

(21) Appl. No.: 11/498,713

(22) Filed: Aug. 4, 2006

(65) Prior Publication Data
   US 2007/0176850 A1   Aug. 2, 2007

(30) Foreign Application Priority Data
   Jan. 27, 2006   (JP) ................................. 2006-018846

(51) Int. Cl.
   *G06T 1/60* (2006.01)
   *G06F 3/12* (2006.01)
(52) U.S. Cl. ...................................... 345/530; 358/1.15
(58) Field of Classification Search .................. 345/530; 358/1.15
   See application file for complete search history.

(56) References Cited

U.S. PATENT DOCUMENTS

| | | | |
|---|---|---|---|
| RE38,637 E * | 10/2004 | Willard | 345/173 |
| 7,019,737 B1 * | 3/2006 | Asai et al. | 345/211 |
| 2003/0147369 A1 * | 8/2003 | Singh et al. | 370/338 |
| 2006/0017659 A1 * | 1/2006 | Ogawa et al. | 345/30 |

FOREIGN PATENT DOCUMENTS

| | | | |
|---|---|---|---|
| JP | 06083722 A | * | 3/1994 |
| JP | 2004159368 A | * | 6/2004 |
| JP | A 2004-302614 | | 10/2004 |
| JP | A 2005-174006 | | 6/2005 |

* cited by examiner

*Primary Examiner* — Benny Tieu
*Assistant Examiner* — Eric A Rust
(74) *Attorney, Agent, or Firm* — Oliff & Berridge, PLC (57) ABSTRACT

A document processing operation system includes: a rewrite unit; and an image display medium for holding display of a document image rewritably and in a substantially no-power supply state, which is attached to the rewrite unit, wherein the rewrite unit performs display image rewrite processing for the image display medium, wherein the image display medium comprises: an operation device that accepts operation input from a user; and an information providing section that transmits operation information entered on the operation device in a wirelessly readable manner, and wherein the rewrite unit comprises: a read section that wirelessly reads the operation information transmitted by the information providing section; a processing section that performs processing relating to document data preset in response to the read operation information; and a write section that writes a document image to the image display medium with the read operation information under a control of the processing section.

12 Claims, 6 Drawing Sheets

| DISPLAY MEDIUM ID | SENSOR ID | OPERATION FUNCTION ID |
|---|---|---|
| M0001 | Sa0001 | Fn0001 |
| M0001 | Sb0001 | Fn0002 |
| M0001 | Sc0001 | Fn0003 |
| M0002 | Sa0001 | Fn0001 |
| M0002 | Sb0001 | Fn0005 |
| ...... | ...... | ...... |

FIG. 2B

| OPERATION FUNCTION ID | DESCRIPTION OF OPERATION FUNCTION EXAMPLE |
|---|---|
| Fn0001 | ERASION OF CURRENT DOCUMENT DISPLAYED ON ELECTRONIC PAPER |
| Fn0002 | DISPLAY OF FOLLOWING PAGE CONTINUOUS WITH CURRENT DOCUMENT DISPLAYED ON ELECTRONIC PAPER |
| Fn0003 | DISPLAY OF PRECEDING PAGE CONTINUOUS WITH CURRENT DOCUMENT DISPLAYED ON ELECTRONIC PAPER |
| ...... | ...... |
| Fn0005 | DISPLAY OF CURRENT LIST OF DOCUMENTS STORED IN ELECTRONIC PAPER |

DOCUMENT RESERVATION PROCESSING OPERATION SYSTEM

BACKGROUND

1. Technical Field

This invention relates to an art of using an image display medium for holding display of a document image rewritably and in a substantially no-power supply state and a document processing operation art of performing rewrite processing of a document image in response to user operation input to the image display medium.

2. Related Art

A document is created, edited, read, etc., by performing data processing using a computer.

To read such an electronic data document, generally a document image is displayed on a display screen of a computer or a document image is printed on paper of a paper medium using a printer.

In recent years, paper-like flexible thin image display medium (electronic paper) capable of holding display of a document image rewritably and in a no-power supply state has been developed as a document read medium that can replace paper.

Unlike paper, such electronic paper enables erasure or overwrite of the document image whose display is held on the display section and can be used repeatedly and therefore it is also desirable to promote the user of the electronic paper from the viewpoint of paper resource savings, etc.

SUMMARY

According to an aspect of the invention, there is provided a document processing operation system comprising:

a rewrite unit; and an image display medium for holding display of a document image rewritably and in a substantially no-power supply state, which is attached to the rewrite unit, wherein the rewrite unit performs display image rewrite processing for the image display medium, wherein the image display medium comprises:

an operation device that accepts operation input from a user; and an information providing section that transmits operation information entered on the operation device in a wirelessly readable manner, and wherein the rewrite unit comprises:

a read section that wirelessly reads the operation information transmitted by the information providing section of the attached image display medium;

a processing section that performs processing relating to document data preset in response to the read operation information; and a write section that writes a document image to the image display medium with the read operation information under a control of the processing section.

BRIEF DESCRIPTION OF THE DRAWINGS

Exemplary embodiment(s) of the present invention will be described in detail based on the following figures, wherein.

DETAILED DESCRIPTION

The invention will be discussed specifically based on exemplary embodiments.

Figure 1:
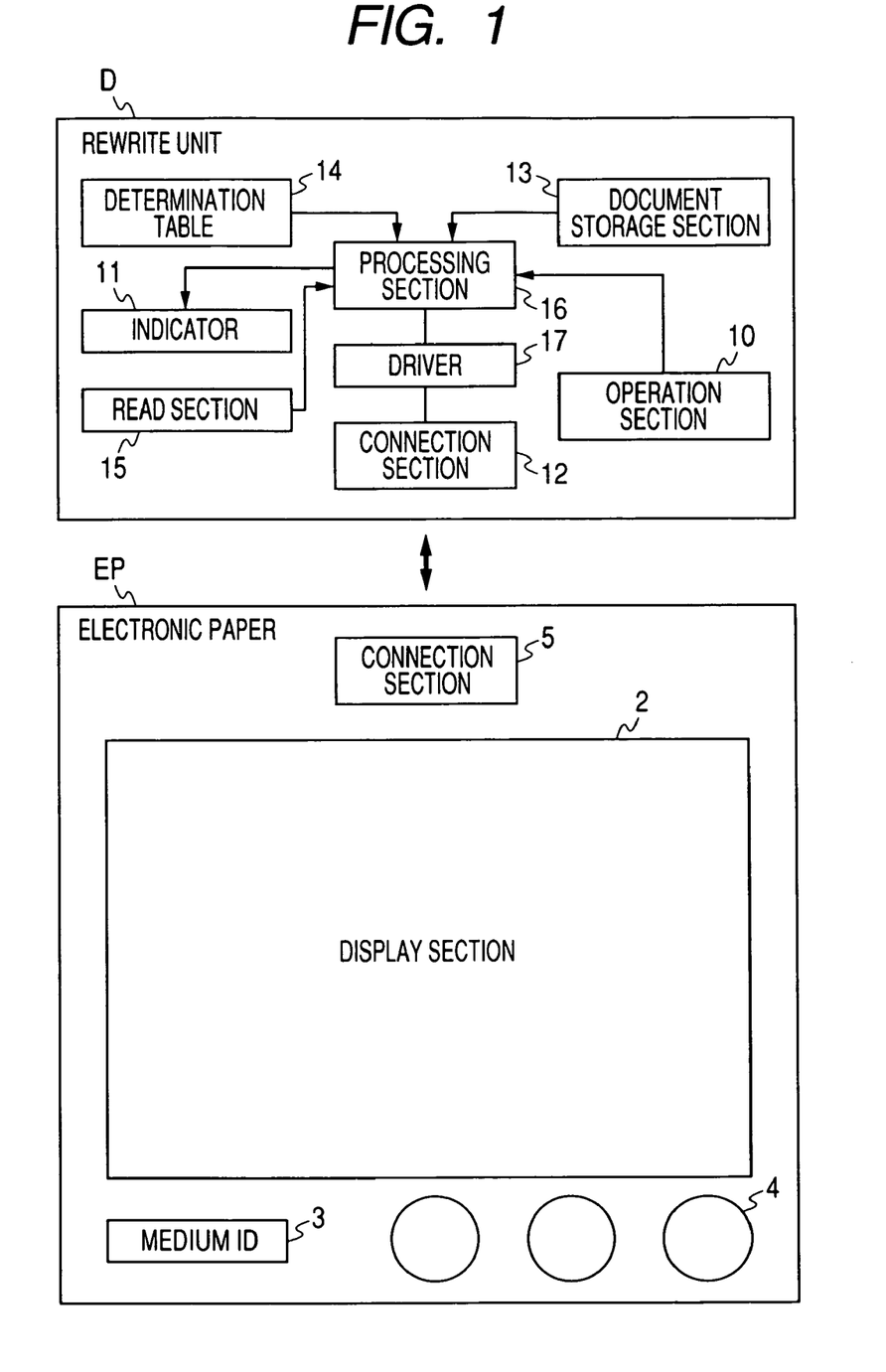
FIG. 1 is a drawing to describe the configuration of a document processing operation system according to one exemplary embodiment of the invention.
Figure 5:
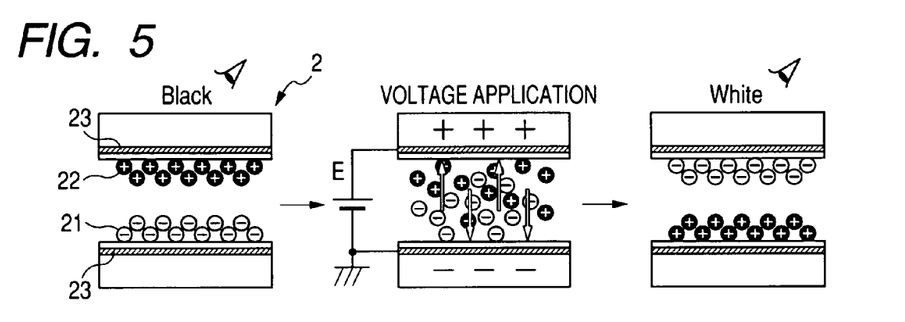
FIG. 5 is a drawing to describe the operation principle of electric write type electronic paper.
Figure 6:
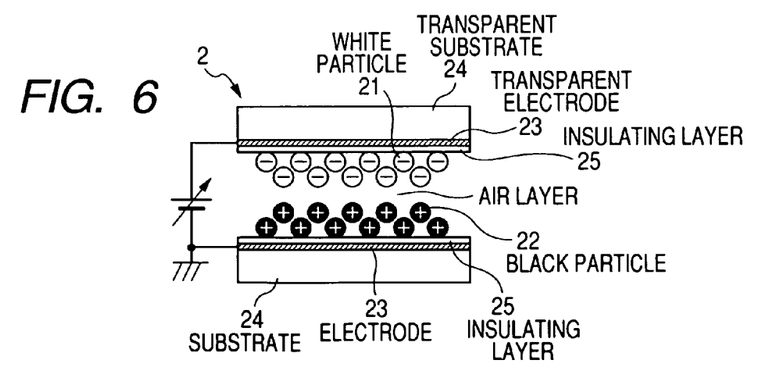
FIG. 6 is a drawing to describe the structure of electric write type electronic paper.

FIG. 1 shows the configuration of a document processing operation system according to one exemplary embodiment of the invention, and the exemplary embodiment uses electric write type electronic paper as shown in FIGS. 5 and 6

An example of using electronic paper as an image display medium will be discussed. However, any other unit having a function of holding display of a document image rewritably and in a substantially no-power supply state, a plurality of operation devices for accepting operation input from the user, and an information providing section for transmitting (retaining) operation information indicating which operation device operation input is executed for in a wirelessly readable manner can also be used.

Figure 3:
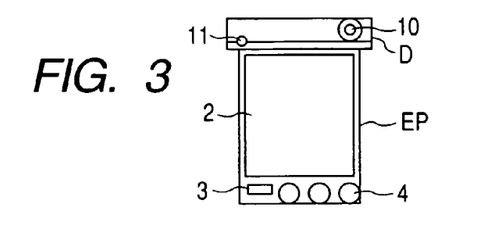
FIG. 3 is an external view of the document processing operation system according to the exemplary embodiment of the invention.

FIG. 3 shows an outline of the system according to the exemplary embodiment. Electronic paper EP for holding display of a document image rewritably and in a substantially no-power supply state can be detachably attached to a rewrite unit D for performing rewrite processing of a document image. Here, "no-power supply state" may not be completely "0", as long as the image cannot be actively rewritten. FIG. 3 shows a state in which electronic paper EP is attached to the rewrite unit D.

The rewrite unit D is provided with an operation part button 10 for accepting a processing start command from the user and an indicator 11 for indicating a state in which processing start based on operation information read from electronic paper EP is put on hold.

The electronic paper EP is provided with a display section 2 for holding display of a document image rewritably and in a substantially no-power supply state, RFID 3 for retaining the display medium ID for identifying the electronic paper in a wirelessly readable manner, and a plurality of (in the exemplary embodiment, three) passive wireless sensors 4 for transmitting the sensor IDs provided in association with the document processing types in a wirelessly readable manner provided that the user executes operation input. In the exemplary embodiment, the sensor ID (further, combination of the sensor ID with the display medium ID) becomes operation information indicating the operation description.

Figure 4:
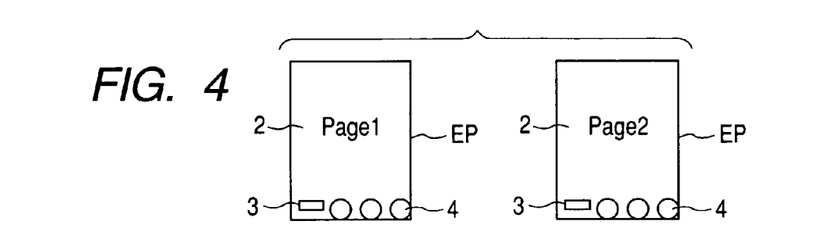
FIG. 4 is a drawing to show a display example of electronic paper according to the exemplary embodiment of the invention.

According to the system of the exemplary embodiment, for example, the user enters an operation command for turning the document displayed on electronic paper EP to the next page and attaches electronic paper EP to the rewrite unit D, whereby the document whose display is held on the display section 2 is turned to the next page for display, as shown in FIG. 4.

The processing operation is described later in detail.

The electric write type electronic paper EP used in the exemplary embodiment is a flexible thin image display medium of a size like A4-size paper, for example, and has the display section 2 occupying the most area.

The display section 2 of the electric write type electronic paper. EP is connected to a driver installed in the rewrite unit D and is driven and can produce rewrite display of a document image, and the electric write type electronic paper EP has a function of continuing to hold an image on the display section 2 in a display state if the drive power of the driver is removed.

The display section 2 of the electric write type electronic paper EP has a structure wherein fine colored particles used as toner with a copier (in the example shown in the figure, white particles 21 and black particles 22) are filled between a pair of surface and back electrodes 23 with at least the surface being transparent and they are sandwiched between a pair of surface and back film substrates 24 with at least the surface being transparent, as shown in FIG. 6 representing the cross-sectional structure of the display section 2. An air layer is provided between the electrode layers 23 so as to allow the colored particles 21 and 22 to move freely, and each matrix-like electrode layer 23 is provided with an insulating layer 25 for preventing the electrode layer from coming in contact with the colored particles 21 and 22. Using a color filter, color display can also be realized as a simple structure.

In the display section 2 of the electric write type electronic paper EP, the negatively (minus) charged white particles 21 remain on the back and the positively (plus) charged black particles 22 remain on the surface in a state in which no voltage is applied to the electrode 23 (however, the electrode 23 is charged in the polarity at the previous drive time) and if the user visually observes the display section 2 from the surface, the display section 2 is placed in a black state, as shown in FIG. 5 representing the operation principle of the display section 2. When the driver operates based on electronic data for inverting the electrode polarity of the required part of the matrix responsive to the information image to be displayed, the positional relationship between the white particles 21 and the black particles 22 is replaced and image information based on the contrast between the white particles 21 and the black particles 22 is displayed on the display section 2. The driver is operated based on different image data, whereby the image information displayed on the display section 2 based on the contrast between the white particles 21 and the black particles 22 can be switched and the electronic paper EP can be reused repeatedly.

Therefore, the electric write type electronic paper EP has the nature of holding the image information displayed on the display section 2 in a substantially no-power supply state as well as the thin and flexible nature like paper and thus is an image display medium that can be used as if it were paper.

The document processing operation system using the electronic paper EP as described above as image display media includes electronic paper EP and the rewrite unit D, and a connection section 5 provided in the electronic paper EP and a connection section 12 provided in the rewrite unit D are electrically connected detachably, as shown in FIG. 1.

Figure 2A:
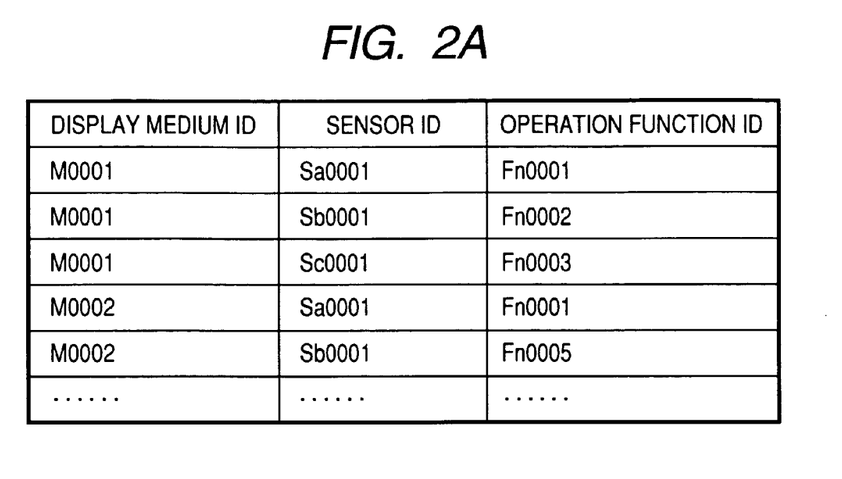
FIGS. 2A and 2B are schematic representations of a determination table according to the exemplary embodiment of the invention.
Figure 2B:
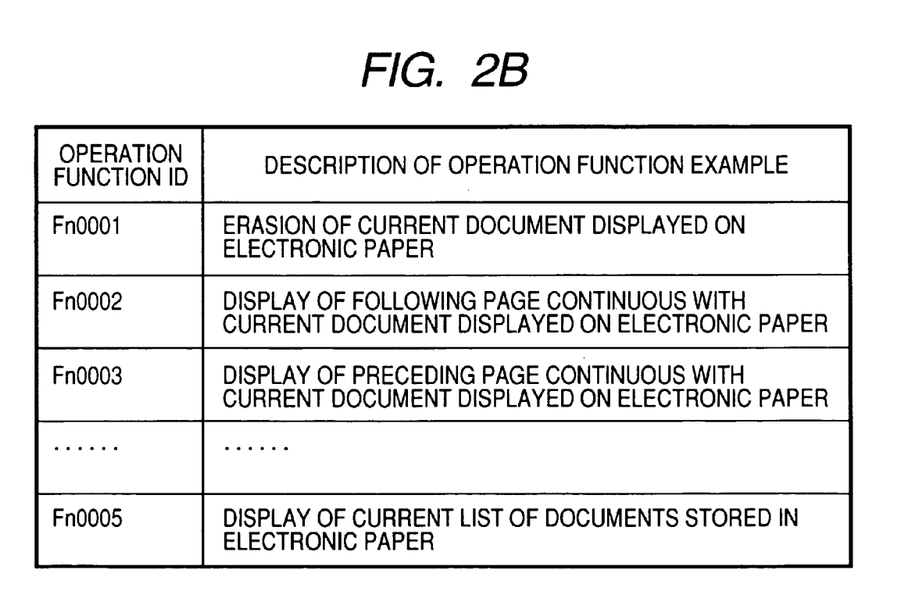

The rewrite unit D includes a document storage section 13 for storing document data to be written to electronic paper EP, a determination table 14 associating the document processing description with each display medium ID and each sensor ID as shown in FIGS. 2A and 2B, a read section 15 for reading the display medium ID and the sensor ID in a wireless manner from the electronic paper EP existing in a predetermined communication range, a processing section 16 for performing processing relating to the document data preset in the determination table 14 in response to the read display medium ID and sensor ID, and a driver (a write section) 17 for writing a document image to the electronic paper EP with the read display medium ID and sensor ID in response to the control of the processing section 16.

Settings as shown in FIGS. 2A and 2B are made in the determination table 14; document processing descriptions (operation functions Fn0001 to Fn0005) are preset in response to display medium IDs (in the figure, M0001 and M0002 for two sheets of electronic paper) and sensor IDs (in the figure, Sa0001, Sb0001, and Sc0001 for three passive sensors). For example, if the display medium ID (M0002) and the sensor ID (Sa0001) are read from electronic paper EP, processing of erasing the current document image whose display is held on the electronic paper EP by writing a blank image (Fn0001) is performed.

In the exemplary embodiment, the processing description is associated with each display medium ID and each sensor ID in the table, so that an appropriate document processing method can be set for each electronic paper EP (namely, for each user). In the invention, however, the processing description may be associated with each sensor ID without using any display medium ID.

The passive sensor 4 is a device of a combination of a button-like operation device and RFID memory for retaining operation information as the polarity s inverted by operation in one. Power is supplied only to the RFID memory with the polarity inverted (namely, the user presses the button) by a radio wave emitted by the read section 15 for starting the RFID memory (passive sensor), and the sensor ID of the passive sensor 4 is read by the read section 15.

The processing of the system according to the exemplary embodiment will be discussed.

If the user operates any one (or one at a time or two or more at the same time) of the passive sensors 4 provided in electronic paper EP corresponding to any desired document processing, the operation information is retained in the passive sensor.

If the user brings the electronic paper EP into the communication zone of the rewrite unit D, the read section 15 reads the display medium ID from RFID 3 of the electronic paper EP and reads the sensor ID from the operated passive sensor 4.

When the display medium ID and the sensor ID are thus read, the processing section 16 lights the indicator 11 for indicating that document processing is in a wait state (reservation state).

If the user attaches the electronic paper EP to the rewrite unit D for connecting the connection sections 5 and 12 and enters a start command through the operation section 10, the processing section 16 references the determination table 14, determines the document processing (operation function) corresponding to the combination of the sensor ID and the display medium ID, acquires the document data required for the document processing from the document storage section 13, and controls the driver 17 based on the acquired document data. The driver 17 drives the display section 2 electrically connected through the connection sections 12 and 5 and writes and displays a document image to and on the display section 2.

That is, the document image displayed on the electronic paper EP is erased or rewritten to the following page, the next page, a document list, etc., in response to the user operation performed for the electronic paper EP.

In the exemplary embodiment, reservation of processing in the rewrite unit is indicated on the indicator 11 for enabling the user to easily keep track of the situation and further user's intention is confirmed as processing is started in response to a user command entered through the operation section 10. In the invention, however, if the steps are skipped, the intended purpose can be accomplished.

Figure 7:
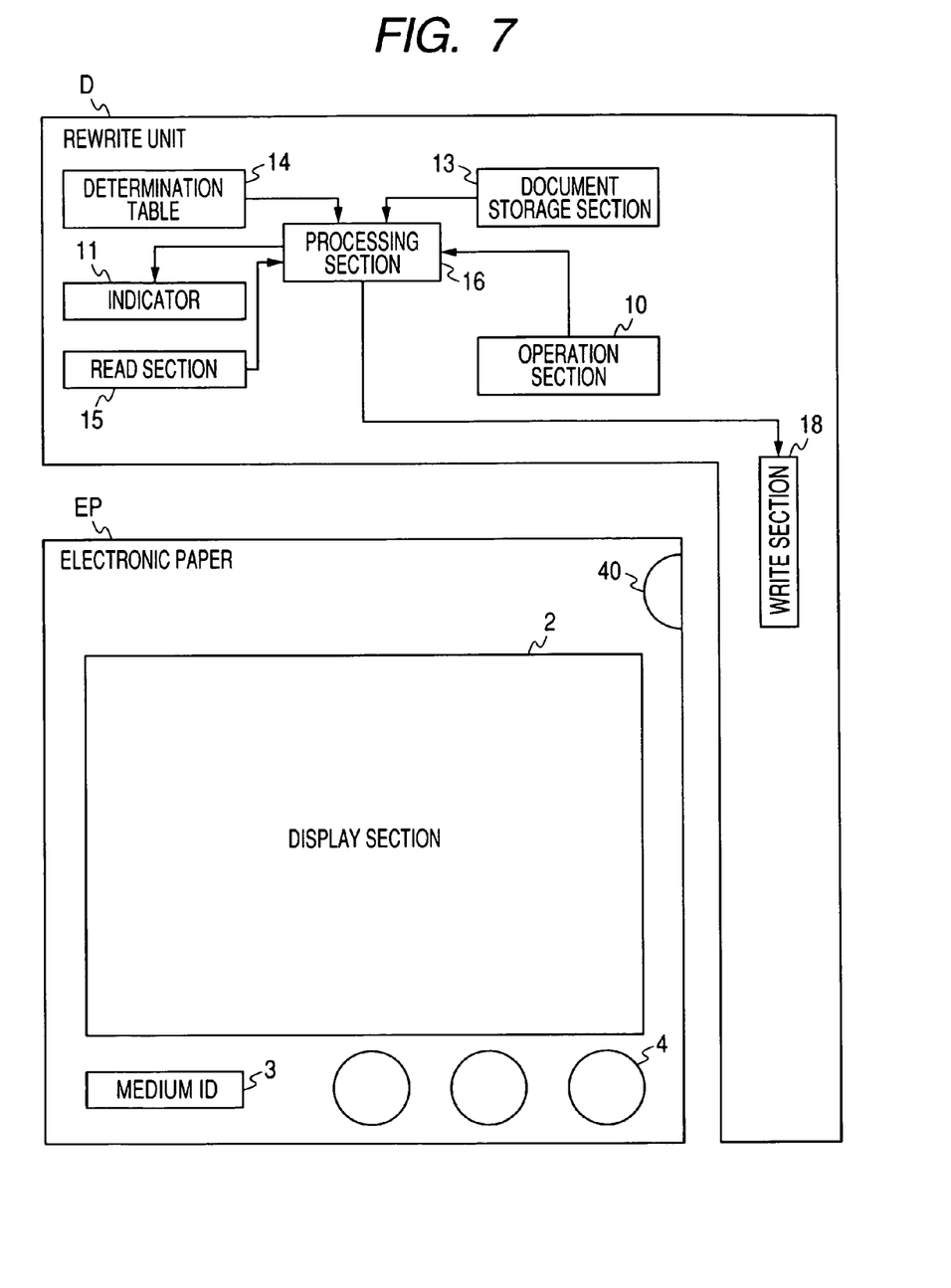
FIG. 7 is a drawing to describe the configuration of a document processing operation system according to another exemplary embodiment of the invention.
Figure 8:
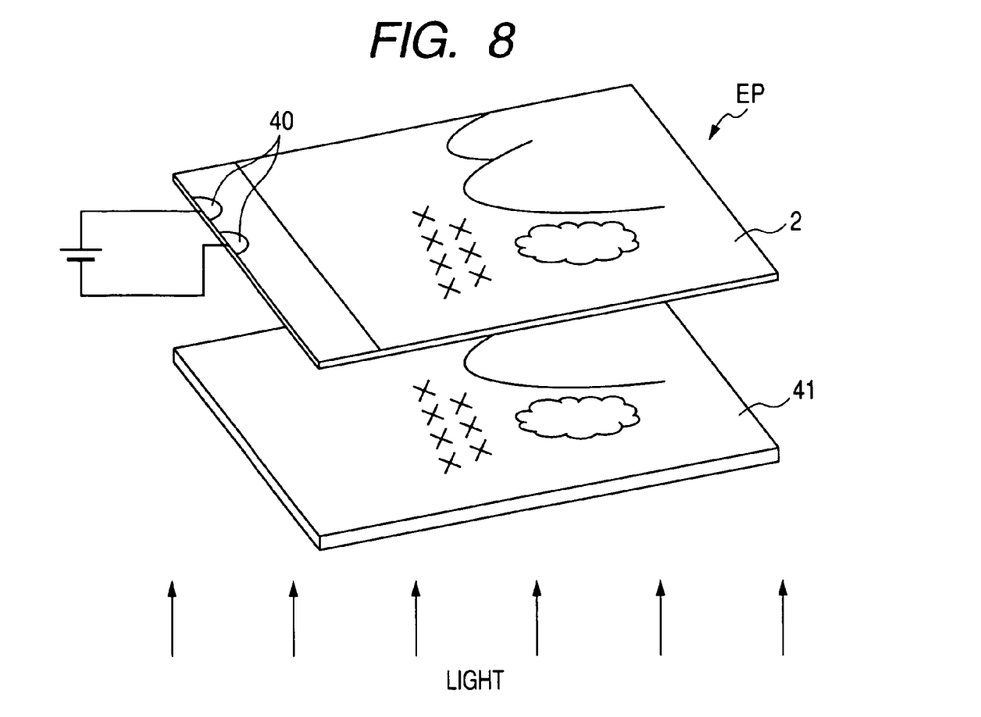
FIG. 8 is a drawing to describe a use method of optical write type electronic paper.
Figure 9:
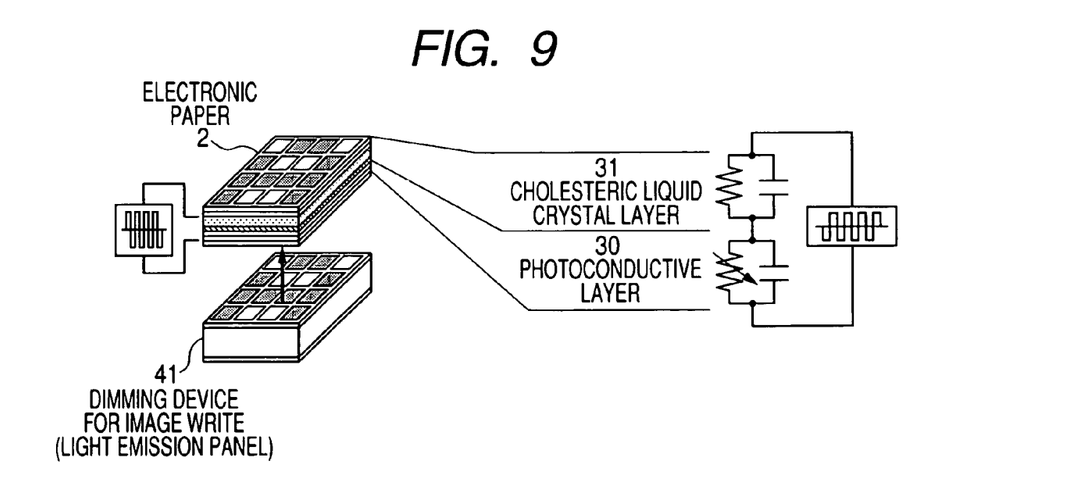
FIG. 9 is a drawing to describe the operation principle of optical write type electronic paper.
Figure 10:
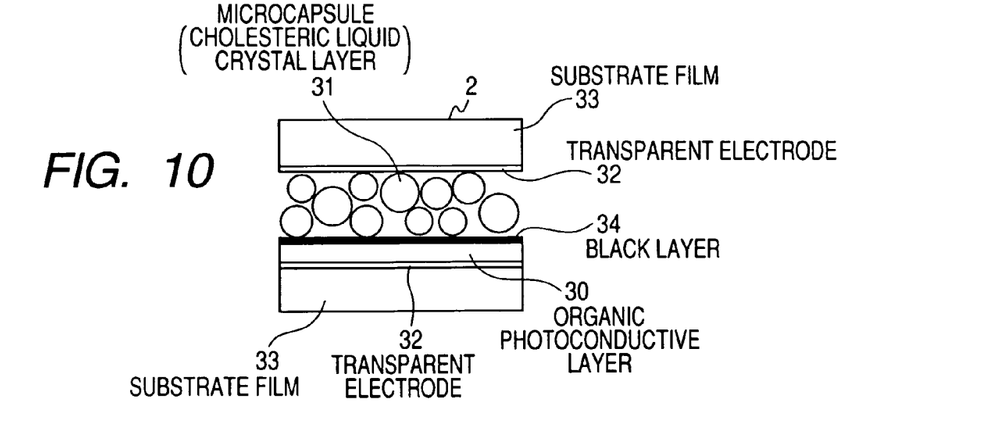
FIG. 10 is a drawing to describe the structure of optical write type electronic paper.
Figure 11A:
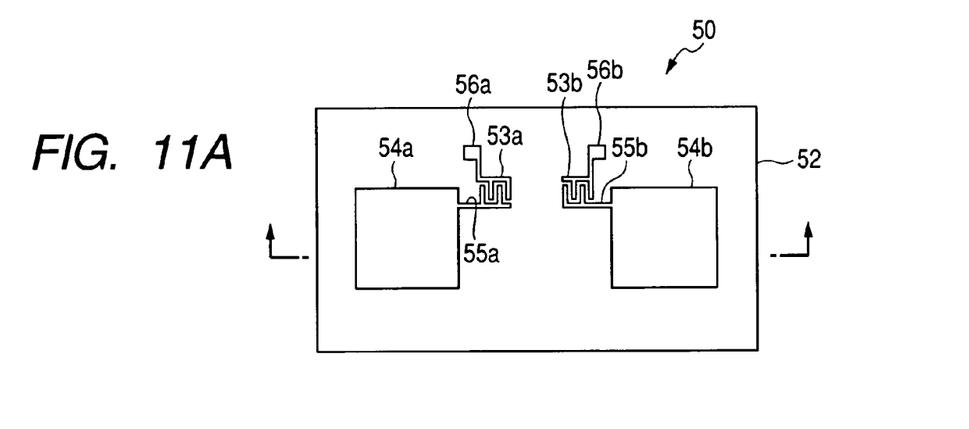
FIGS. 11A and 11B are drawings to describe the structure relating to one example of a passive sensor.
Figure 11B:
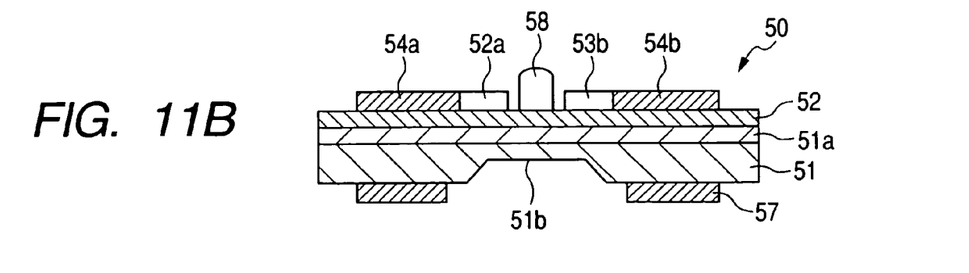

FIG. 7 shows the configuration of a document processing operation system according to another exemplary embodiment of the invention. In the exemplary embodiment, optical write type electronic paper as shown in FIGS. 8 to 10 is used. Functional parts similar to those previously described with reference to FIG. 1 are denoted by the same reference numerals and will not be discussed again.

The optical write type electronic paper EP in the exemplary embodiment has an electrode 40 for applying a write voltage to a display section 2 in addition to the display section 2 for holding display of a document image, RFID 3 for retaining the display medium ID, and passive sensors 4.

The optical write type electronic paper EP is a flexible thin medium of a size like A4-size paper, for example, and has the display section 2 occupying the most area for holding display of a document image in a substantially no-power supply state.

For example, as shown in FIG. 8, a document image is displayed on a liquid crystal panel 41 and while a voltage from an external power supply is applied to the electrode 40, optical write type electronic paper EP is put on the liquid crystal panel 41 and light is applied, whereby the image displayed on the liquid crystal panel 41 can be transferred to the display section 2 for storage. In short, the optical write type electronic paper EP has a function of transferring the projected image information to the display section 2 as voltage is applied to the electrode 40 and continuing to hold the image information in a display state still after the voltage applied to the electrode 40 is removed.

To use the optical write type electronic paper EP, a write section 18 provided in a rewrite unit D has a function of applying write voltage to the electrode 40 of the electronic paper EP attached to the rewrite unit and projecting a document image onto the display section 2.

The optical write type electronic paper EP has a structure wherein a layer of organic photoconductive material (organic photoconductive layer) 30 used with a copier and a layer of liquid crystal display material (cholesteric liquid crystal layer put into microcapsules) 31 are used in combination and these layers are sandwiched between a pair of surface and back transparent electrodes 32 and the layered body is sandwiched between a pair of surface and back transparent substrate films 33, as shown in FIG. 10 representing the cross-sectional structure of the display section 2. In the structure, monochrome image display can be produced with white display provided by the cholesteric liquid crystal layer 31 reflecting light and black display as light passes through the liquid crystal layer 31 and is absorbed in a black layer 34 provided between the cholesteric liquid crystal layer 31 and the organic photoconductive layer 30. Further, since the cholesteric liquid crystal has a characteristic of interference reflecting of color light responsive to helical pitches, the cholesteric liquid crystal layer 31 is formed by depositing liquid crystal materials different in helical pitch, so that it is also possible to realize color display as a simple structure.

For example, an image to be transferred to the dimming device panel for image write (light emission panel) 41 is displayed on the optical write type electronic paper EP and is projected on the display section 2 and when a voltage is applied to the electrode 40, intensity of light is converted into the reflection density in a moment and the projection image is retained, as shown in FIG. 9 representing the operation principle of the display section 2. An erasion voltage is applied to the electrode 40, whereby the image information retained in the display section 2 can be erased and the optical write type electronic paper EP can be used repeatedly as write and erasion are repeated. Without performing such erasion processing for the optical write type electronic paper EP, a voltage is applied to the electrode 40 and a new image is projected as described above, whereby the image information retained in the display section 2 can also be overwritten with new information; the optical write type electronic paper EP can be used repeatedly as such overwrite processing is performed.

Therefore, the electric write type electronic paper EP has the nature of holding the image information transferred by projecting an image in a substantially no-power supply state as well as the thin and flexible nature like paper and thus is an image display medium that can be used as if it were paper used with a printer and a copier and moreover can be reused repeatedly.

Also in the exemplary embodiment, similar processing to that of the system shown in FIG. 1 is performed.

If the user operates any of the passive sensors 4 provided in the electronic paper EP corresponding to any desired document processing, the operation information is retained in the passive sensor.

If the user brings the electronic paper EP into the communication zone of the rewrite unit D, a read section 15 reads the display medium ID from RFID 3 of the electronic paper EP and reads the sensor ID from the operated passive sensor 4.

When the display medium ID and the sensor ID are thus read, a processing section 16 lights an indicator 11 for indicating that document processing is in a wait state (reservation state).

If the user attaches the electronic paper EP to the rewrite unit D, connects the electrode 40 to the write section 18, and enters a start command through an operation section 10, the processing section 16 references a determination table 14, determines the document processing (operation function) corresponding to the combination of the sensor ID and the display medium ID, acquires the document data required for the document processing from a document storage section 13, and displays a document image on the write section 18 based on the document data. The write section 18 applies a voltage to the electrode 40, projects a document image onto the display section 2, and writes and displays the document image to and on the display section 2.

If a display section part for holding display of a document image rewritably and in a substantially no-power supply state and a rewrite unit part for performing rewrite processing of a document image on the display section can be separated in an electronic paper system, the user can receive the merit of easily handling a plurality of display section portions (image display media). However, the user cannot perform document rewrite operation from the display medium separated from the rewrite unit and the merit based on information processing technology such as update of display image cannot be exhibited.

The invention realizes that even if an image display medium for holding display of a document image rewritably and in a substantially no-power supply state is detached from a rewrite unit, the user can perform operation required for handling a document displayed on the image display medium by a natural action like handling a document printed on a paper medium.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A document processing operation system comprising
a rewrite unit; and
an image display medium for holding display of a document image rewritably and in a substantially no-power supply state, which is attachable to the rewrite unit, wherein the rewrite unit performs display image rewrite processing for the image display medium,
wherein the image display medium comprises:
an operation device that accepts operation input from a user; and
an information providing section that transmits operation information entered on the operation device to the rewrite unit in a wirelessly readable manner so as to reserve a process corresponding to the operation information in the rewrite unit process corresponding to the operation information in the rewrite unit when the image display medium enters into a communication zone set by the rewrite unit before attachment to the rewrite unit, and
wherein the rewrite unit comprises:
a read section that wirelessly reads the operation information transmitted by the information providing section of the attached image display medium;
a processing section that performs the reserved process relating to document data preset to the image display medium in response to the read operation information when the image display medium attaches to the rewrite unit; and
a write section that writes a document image to the image display medium with the read operation information under a control of the processing section.

2. The document processing operation system according to claim 1,
wherein the image display medium comprises:
a plurality of passive sensors corresponding to operation types, and each of the plurality of passive sensors has a function of detecting user operation and a function of transmitting sensor identification information in a wirelessly readable manner in response to a read signal from the rewrite unit upon detection of user operation;
an operation device that accepts operation input from a user by the plurality of passive sensors; and
an information providing section that transmits operation information entered on the operation device in a wirelessly readable manner, and
wherein the rewrite unit has a correspondence table in which types of processing relating to document data are preset in response to the sensor identification information, and the processing section performs processing relating to document data preset in response to the sensor identification information read by referencing the correspondence table.

3. The document processing operation system according to claim 1,
wherein the image display medium comprises:
a plurality of passive sensors corresponding to operation types, and each of the plurality of passive sensors has a function of detecting user operation and a function of transmitting sensor identification information in a wirelessly readable manner in response to a read signal from the rewrite unit upon detection of user operation;
an operation device that accepts operation input from a user by the plurality of passive sensors;
an information providing section that transmits operation information entered on the operation device in a wirelessly readable manner; and
a medium ID storage section that retains medium identification information for identifying the image display medium in a wirelessly readable manner, and
wherein the rewrite unit has a correspondence table in which types of processing relating to document data are preset in response to a combination of the sensor identification information and the medium identification information, the read section wirelessly reads the medium identification information from the image display medium in addition to the sensor identification information, and the processing section performs processing relating to document data preset in response to the sensor identification information and the medium identification information read by referencing the correspondence table.

4. The document processing operation system according to claim 1,
wherein the rewrite unit further comprises an operation section that accepts a processing start command from a user, and the processing section starts processing put on reservation in response to entry of the processing start command.

5. The document processing operation system according to claim 4,
wherein the rewrite unit further comprises an indicator that indicates a state in which processing start of the processing section is put on hold.

6. The document processing operation system according to claim 1,
wherein the image display medium is a self-write type electronic paper having a function of holding display of a document image as writing is driven by a driver of the write section.

7. The document processing operation system according to claim 1,
wherein the image display medium is an optical write type electronic paper having a function of transferring a document image projected from the write section and holding display of the document image.

8. The document processing operation system according to claim 1,
wherein the image display medium comprises:
a plurality of passive sensors, and each of the plurality of passive sensors has a function of detecting user operation and a function of holding a detection state in a wirelessly readable manner;
a plurality of operation devices that accept operation input from a user by the plurality of passive sensors; and
an information providing section that retains operation information indicating which operation device operation input is executed for in a wirelessly readable manner of the processing unit.

9. The document processing operation system according to claim 1, wherein the operation device accepts one operation input from the user at a time.

10. A rewrite unit to which an image display medium for holding display of a document image rewritably and in a substantially no-power supply state is attached for performing display image rewrite processing for the image display medium, the rewrite unit comprising:

a read section that wirelessly reads operation information of user input transmitted to the image display medium in a wirelessly readable manner, the operation information reserving a process in the rewrite unit;

one or more processors that perform the process reserved relating to document data preset to the image display medium, the reserved process being reserved when the image display medium enters into a communication zone set by the rewrite unit before attachment to the rewrite unit, and to be performed in response to the read operation information when the image display medium attaches to the rewrite unit; and a write section that writes a document image to the image display medium with the read operation information under a control of the processing section.

11. A non-transitory computer readable medium storing a program causing a computer to execute a process for holding display of a document image rewritably and in a substantially no-power supply state, and performing display image rewrite processing for an image display medium, the process comprising:

reading operation information of user input transmitted to the image display medium in a wirelessly readable manner, the operation information reserving a process in the rewrite unit;

performing the reserved process relating to document data preset to the image display medium, the reserved process being reserved when the image display medium enters into a communication zone set by the rewrite unit before attachment to the rewrite unit, and to be performed in response to the read operation information when the image display medium connects to the computer; and writing a document image to the image display medium with the read operation information under a control of a processing section.

12. A document processing operation method comprising:

accepting operation input from a user on an image display medium for holding display of a document image rewritably and in a substantially no-power supply state;

transmitting operation information to a rewrite unit from the image display medium in a wirelessly readable manner to reserve a process corresponding to the operation information in the rewrite unit when the image display medium enters into a communication zone set by the rewrite unit before attachment to the rewrite unit;

wirelessly reading the operation information transmitted from the image display medium;

performing the reserved process relating to document data preset to the image display medium in response to the read operation information when the image display medium attaches to the rewrite unit; and writing a document image to the image display medium.

* * * * *